United States Patent [19]
McClellan

[11] 3,848,353
[45] Nov. 19, 1974

[54] RATTLE SOUNDER FOR FISHING LURES

[75] Inventor: Bingham A. McClellan, Traverse City, Mich.

[73] Assignee: McClellan Industries, Inc., Traverse City, Mich.

[22] Filed: July 5, 1973

[21] Appl. No.: 376,813

[52] U.S. Cl. .............................................. 43/42.31
[51] Int. Cl. ............................................ A01k 85/00
[58] Field of Search............... 43/42.31, 42.1, 42.16, 43/43.2, 42.22; 46/191, 193

[56] References Cited
UNITED STATES PATENTS

| | | | |
|---|---|---|---|
| 1,191,031 | 7/1916 | Peters | 43/43.2 |
| 1,993,798 | 3/1935 | Peterson | 43/42.22 |
| 2,763,954 | 9/1956 | Bunker | 43/42.31 |
| 2,983,065 | 5/1961 | Ferguson et al. | 43/42.22 X |
| 3,359,674 | 12/1967 | Strumor | 43/42.22 X |
| 3,466,787 | 9/1969 | Collins | 43/42.31 X |
| 3,705,465 | 12/1972 | Charney | 43/42.31 X |

Primary Examiner—Warner H. Camp
Attorney, Agent, or Firm—Austin A. Webb

[57] ABSTRACT

A hollow shell of bullet shaped external contour has an integral cylindrical tube extending therethrough. The torus shaped interior of the shell has plural small spherical shot loosely disposed therein to rattle when shaken. The shell can be mounted alternatively around a wire of a safety pin type of lure and hook assembly; or around a leader above a hook. It may also be mounted around a rubber band stretched between the eye of a lure assembly and the barb of the hook on the assembly. A small plate has one hole for connection to the rubber band and another hole for engagement with the hook barb in the latter instance. A modification places nut-like hexagonal slugs in a cavity in a plastic housing with an axial hole through the housing to pass a line or lure wire through the housing and slugs.

2 Claims, 7 Drawing Figures

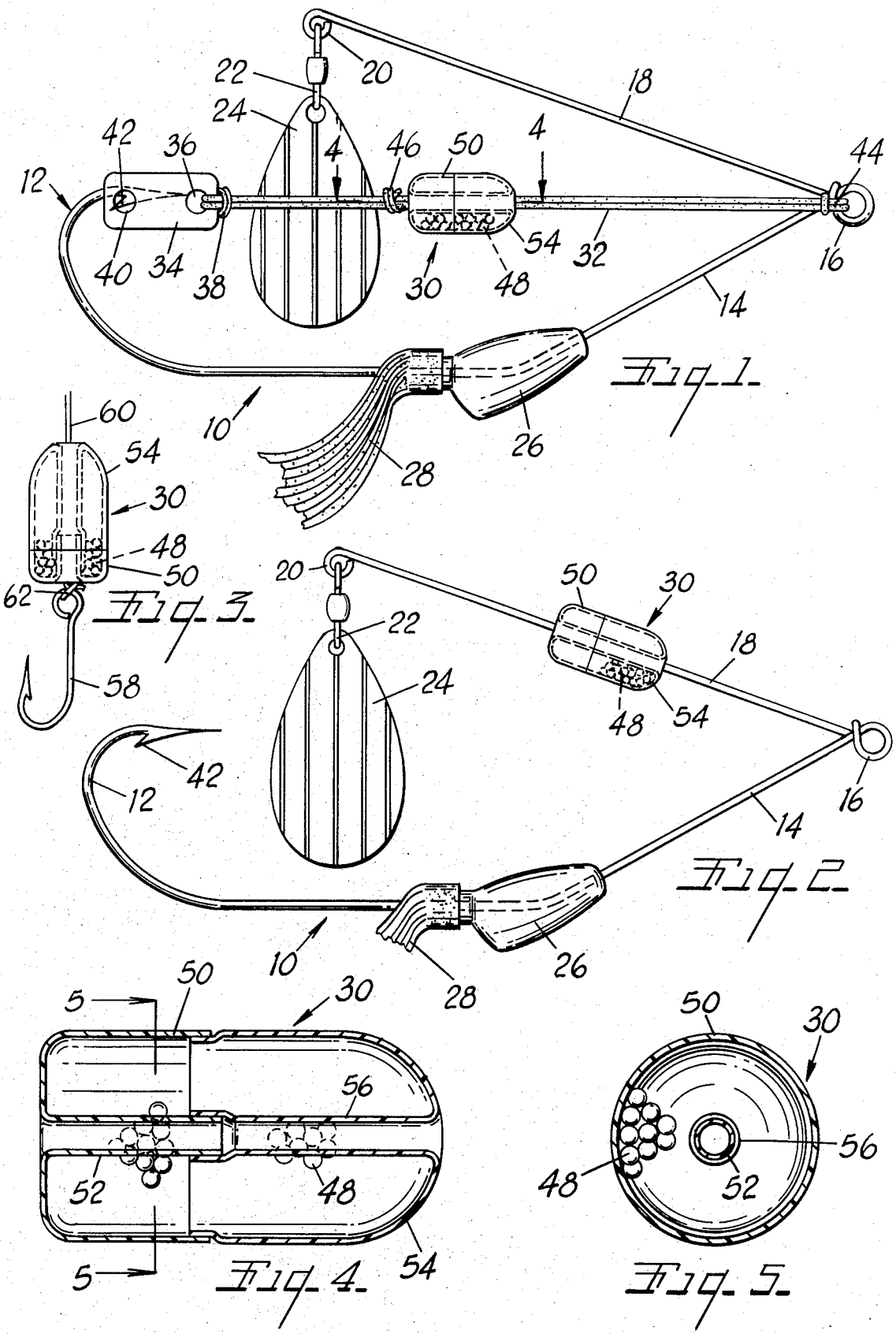

RATTLE SOUNDER FOR FISHING LURES

DESCRIPTION

The drawings, of which there are two sheets, illustrate two forms of the rattle and three alternative ways of mounting them.

FIG. 1 is an elevational view of a "safety pin" type of hook and lure with the rattle detachably mounted thereon by a rubber band.

FIG. 2 is an elevational view of a "safety pin" type of hook and lure with the rattle permanently mounted thereon.

FIG. 3 is an elevational view of the rattle attached to the leader of a hook.

FIG. 4 is an enlarged cross sectional view of the rattle taken along the plane of the line 4—4 in FIG. 1.

FIG. 5 is a transverse cross sectional view taken along the line 5—5 in FIG. 4.

Figure 6:
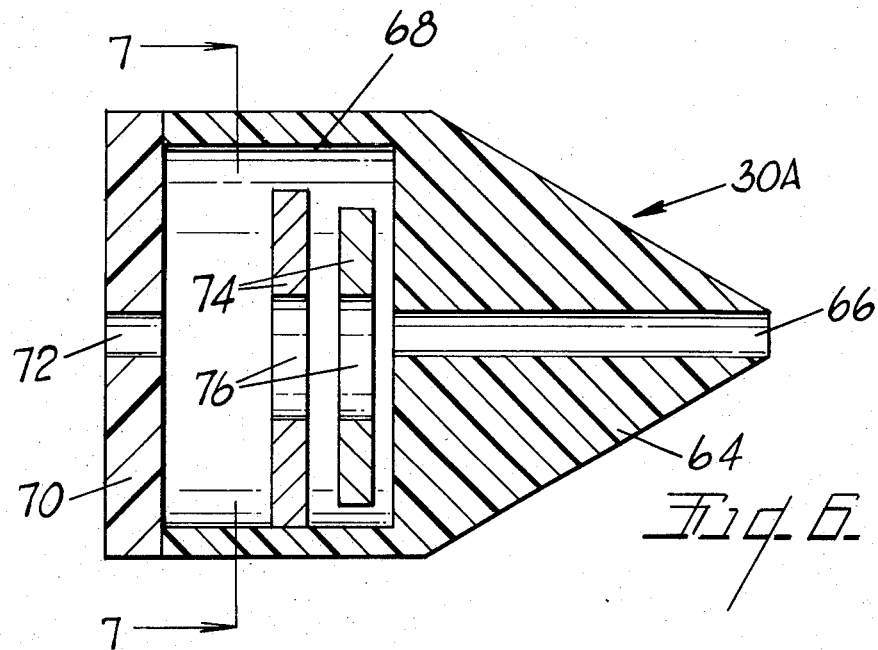
FIG. 6 is a longitudinal cross sectional view through a modified form of the rattle.

FIG. 1 illustrates a "safety pin" type of hook and lure assembly in which the shank 10 of a hook 12 is elongated and angled along one arm 14 to a line attaching eye 16. From the eye, the shank is angled oppositely and rearwardly in a second arm 18 to a loop 20. Attached to the loop as by rings 22 is a spinner 24. The first angled arm 14 has a weighted body 26 secured thereon, from which streamers or other attraction getting strands 28 may extend.

The rattle generally indicated at 30 is selectively attached to the lure and hook assembly by a rubber band 32. A small rigid plate 34 is attached to one end of the rubber band by passing the band through a hole 36 and then through the looped end of the band as at 38. The plate has another hole 40 therein that hooks over the barb 42 of the hook. The other end of the rubber band is similarly passed through the eye 16 and through itself as at 44. A knot 46 may be tied in the band to limit rearward motion of the rattle. If desired, the plate 34 may be omitted, in which case the end of the rubber band hooks directly on the barb. A simple wire ring may be substituted for the plate 34.

The rattle 30 has a number of small shot or marbles 48 loosely retained therein, and when the lure is trolled through the water the action of the spinner 24 causes the lure and the rattle to shake causing the shot to rattle.

As is more particularly shown in FIGS. 4 and 5, the rattle is a hollow bullet shaped body of light weight. The body consists of a rear half 50 which has an integral central tube 52 and fits telescopically over a front half 54 having an opposed central tube 56. The two halves are conveniently made of molded plastic and are sealed water tight after the shot 48 are placed therein. The plastic may be clear or opaque.

FIG. 2 shows the rattle 30 more or less permanently attached to the arm 18 of the "safety pin" lure by having the arm passed through the tube 52-56 before the loop 20 is formed.

FIG. 3 shows the rattle selectively attached to a hook 58 by being threaded onto a leader 60 before the leader is tied to the hook as at 62. The hook may carry natural bait or be part of a manufactured lure.

The number and weight of the shot 48 enclosed in the rattle may be varied as desired. Particularly for use as in FIG. 3 the number of shot can be increased so that the rattle also acts as a slide-on sinker. The hook may be baited with natural bait or be part of an aritificial lure.

Figure 7:
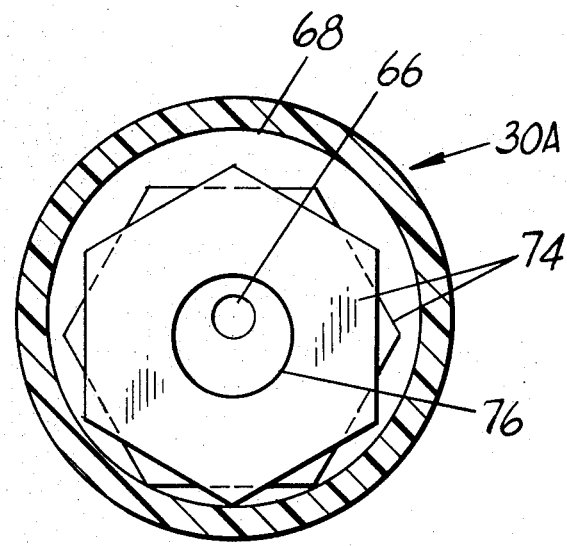
FIG. 7 is a cross sectional view taken along the plane of the line 7—7 in FIG. 6.

The modified rattle 30A shown in FIGS. 6 and 7 consists of a housing formed of a conical piece of plastic 64 having an axial hole 66 therethrough and a cylindrical recess 68 in its bottom or rear end. The rear end of the recess is closed by a circular plate 70 glued or bonded to the end of the housing. The plate 70 has a hole 72 in the center which aligns with the axial hole 66.

Within the cylindrical recess are two or more loose rattle slugs 74 of regular polygonal shape. The slugs shown are hexagonal-like machine nuts. The slugs have central holes 76 which are large enough to uncover or expose the line of holes 66 and 72.

The modified rattle 30A can be used in any of the mountings shown for the first form 30 of the rattle. The holes 66, 72 and 76 pass either the rubber bands 32 of FIG. 1, or the wire 18 of FIG. 2, or the line leader 60 of FIG. 3. When the lure or line is moved the housing 64 moves and the slugs 74 roll within the recess 68. Each corner of the polygonal sides of the slugs creates a sharp sound or rattle as it strikes the inside of the housing.

What is claimed as new is:

1. A rattle lure attachment for fishing lures comprising a hollow body having a cylindrical interior cavity closed at each end, and defining aligned central holes at each end coaxial with said cavity, and a plurality of flat metal slugs of polygonal outlines positioned loosely in said cavity to strike against the surface thereof when the body is moved, said slugs having central bores larger than the holes in said body and being sized to surround the axis of said cavity when the peripheries of the slugs engage the periphery of the cavity.

2. A rattle lure as defined in claim 1 in which said body includes a first end part with said cavity formed in one end, and an end wall secured over the end of said cavity.

* * * * *